United States Patent [19]

King

[11] Patent Number: 5,004,942
[45] Date of Patent: Apr. 2, 1991

[54] POWER AND CONTROL CHAMBER FOR DYNAMOELECTRIC MACHINES

[75] Inventor: James L. King, Troy, Ohio

[73] Assignee: A. O. Smith Corporation, Milwaukee, Wis.

[21] Appl. No.: 432,173

[22] Filed: Nov. 6, 1989

Related U.S. Application Data

[63] Continuation-in-part of Ser. No. 306,887, Feb. 6, 1989, abandoned.

[51] Int. Cl.⁵ .............................. H02K 9/00; F28F 9/02
[52] U.S. Cl. ............................................. 310/89; 310/64
[58] Field of Search ..................... 310/43, 50, 64, 89

[56] References Cited

U.S. PATENT DOCUMENTS

| | | | |
|---|---|---|---|
| 2,209,362 | 7/1940 | Sutherland | 310/89 |
| 3,365,597 | 1/1968 | Hanyu | 310/89 |
| 4,510,404 | 4/1985 | Barrett et al. | 310/89 |
| 4,840,222 | 6/1989 | Lakin et al. | 310/64 |

FOREIGN PATENT DOCUMENTS 53-72111  6/1978  Japan ..................... 310/89

*Primary Examiner*—Steven L. Stephan
*Assistant Examiner*—D. L. Rebsch
*Attorney, Agent, or Firm*—Andrus, Sceales, Starke & Sawall

[57] ABSTRACT

A motor includes a main frame with a stator unit and a rotor unit mounted within the frame. The frame extends axially from one end of the stator unit to form a compartment having an outer cylindrical wall. Power control components within the compartment are interconnected to each other and to the motor windings and incoming power and control cables within the compartment. An end cap closes the compartment. The cap includes a central opening. A door is releasably secured within the opening, with an electronic control module having heat sensitive elements secured to the inner wall of the door. The door is of cast aluminum having an inner mounting plate overlapping the opening and an integral decorative plate extended through the opening. The outer face of the decorative plate is recessed to define a logo or the like and increase the heat dissipation surface. The door and module have abutting inner planar surfaces for transfer of heat from the sensitive elements through the door to the surrounding environment. A second embodiment forms the compartment by a cup-shaped cover having a diameter of the main frame and secured extending axially therefrom. The access door is mounted in an end opening.

18 Claims, 1 Drawing Sheet

POWER AND CONTROL CHAMBER FOR DYNAMOELECTRIC MACHINES

This is a continuation-in-part application of U.S. application Ser. No. 07/306,887, filed Feb. 6, 1989 and now abandoned.

BACKGROUND OF THE PRESENT INVENTION

The present invention relates to a dynamoelectric machine having an integrated power and control equipment compartment integrated and particularly a rotary motor having a power and control equipment compartment as an extension of a motor main frame.

Rotary electric motors are used in installations and applications requiring various operating conditions including variations in speed, timed operation and the like. A typical example includes motor-pump units for circulating water in spas, whirlpools and similar devices in domestic installations, such as homes, offices, hotels, motels and the like. A particularly satisfactory motor-pump unit is disclosed in the co-pending application of King et al entitled "Multiple Compartmented Dynamoelectric Machine" filed on Oct. 26, 1989 and assigned to a common assignee herewith.

As more fully disclosed therein, a motor main frame is provided within which a plurality of compartments are formed by appropriate internal bearing frames and dividing wall frames. An outer end compartment is integrally formed in an extended portion of the main motor frame. The various power and control components are mounted and interconnected to each other and to an incoming power cable and the windings within the compartment to provide controlled energization of the winding. Remote pneumatic actuators as well as low voltage control units are often provided and interconnected to each other and to the control system within the integrated motor compartment. An alternate construction using an extension of the main frame is disclosed in the co-pending application of James L. King entitled "Electric Motors Having Integrated Control Housing And Method of Fabrication" filed on Feb. 6, 1989 and U.S. Ser. No. 07/306,887, wherein a separate cup-shaped end cap is secured to the end of the motor main frame adjacent a bearing end frame to define a power and control equipment chamber or compartment projecting as an apparent extension of the main frame. Again the various power and control devices are mounted within the compartment and interconnected to each and to the motor windings to provide the integrated housed control assembly. As disclosed in the above, heat sensitive electronic modules may advantageously be mounted directly to the cap to optimize the heat dissipation from the electronic module to the surrounding atmosphere.

In all such integrated systems, the various controls are thus housed within an enclosure forming an integrated part of the motor frame. Removal of the cap cover structures are required for access to the equipment including that secured to the end frame and/or to the cap structure as such. Although, access to all of the various components and connections must of course be provided, various components require more attention during the life of the motor than others. The mounting of the systems within the compartment and particularly to the cover structures provides a very convenient assembly and fabrication system. Removal however does require the appropriate attention to the various connections between the components and the equipment as a result generally of such common removal of a number of components.

In many instances, general access is therefore not required for servicing of the power and control equipment. For example, in motors with electronic control modules, only access to the control board or module will most often be required.

Although such motors thus provide highly improved approaches to motor control systems, the common mounting and attachment for insertion and removal presents some problems.

SUMMARY OF THE PRESENT INVENTION

The present invention is particularly directed to the provision of a special access door structure to an integrated power and control equipment chamber or compartment formed as an integral part and particularly formed as an extension of the main frame of a dynamoelectric machine and particularly electronically controlled variable speed motors. The present invention has been particularly applied in the development of electric motor pump units such as used in residentially installed spas, whirlpools and the like and is described hereinafter in connection with such a motor for purposes of clarity and clear understanding of the present invention. Generally, in accordance with the present invention, the extended power and control equipment chamber of the main frame includes a suitable releasable cover member forming a part of the extended chamber and having appropriately mounted stand-off elements for mounting of power and control equipment thereto. The outer wall includes a special door structure releasably secured within an opening in the outer wall and providing direct and limited access to the chamber and particularly to one or more control components which is preferably mounted to the door structure and which normally requires maximum monitoring and servicing. More particularly in accordance with the present invention, the outer chamber wall is provided with an opening. A completely separate cover or door member is releasably secured within said opening with an interconnection providing an apparent continuous uninterrupted wall structure. Control components are mounted to the interior of the door such that removal of the door directly exposes such components. As applied to an electronically controlled motor structure, the electronic control unit is secured to the interior of the door structure. Electronic equipment generally includes various temperature sensitive elements. In accordance with one significant feature, of the present invention, the removable door is specially formed to function as a heat sink, with the electronic control unit mounted in engagement with the door, and in particular with the heat sensitive elements affixed in maximum heat exchange relationship with the heat sink portion of the door. More particularly in accordance with this aspect of this invention, the door will include an inner metal heat sink member in combination with an outer portion projecting outwardly from the heat sink as an integral extension thereof. The outer extension is particularly formed with a decorative configuration such as the manufacture's trademark or logo. The outer wall structure is formed with appropriate recesses and projections defining the logo and further defining increased heat dissipating surface. The door member thus establishes effective heat dissipation for maximum effective circuit operation while simultaneously providing an esthetically appealing motor assembly. Such a structural arrangement is highly significant in applications for spas, whirlpools and the like for use in residential installations.

In a particularly practical embodiment of the present invention, the door member is a molded plastic cap member having an inwardly projecting snap connectors projecting inwardly from the inner surface of the cap about the opening. The door member is formed with an inner metal plate defining a heat sink and having a configuration somewhat larger than the opening. The snap connectors are preferably formed with suitable inner cam surfaces such that the plate can be directly pushed into the connectors and similarly removed by forcing the plate into the chamber. The snap connector thus deflects outwardly until the plate moves into alignment with the connectors and then snap inwardly to the lock positions. The outer wall portion of the door generally has a peripheral configuration corresponding to the opening, which may of course be suitably configured and shaped for esthetic purposes as well as maximum cooling. The outer wall projects outwardly of the plastic cover with the appropriate recesses and projecting walls to define an effective thinned heat distributing surface.

The present invention thus provides a very effective limited access door to an integrated motor power and control equipment chamber with the access to those components most often requiring checking and servicing.

BRIEF DESCRIPTION OF THE DRAWINGS

The drawings furnished herewith illustrate a best mode for carrying out the invention and described hereinafter.

In the drawings.

DESCRIPTION OF THE ILLUSTRATED EMBODIMENT

Figure 1:
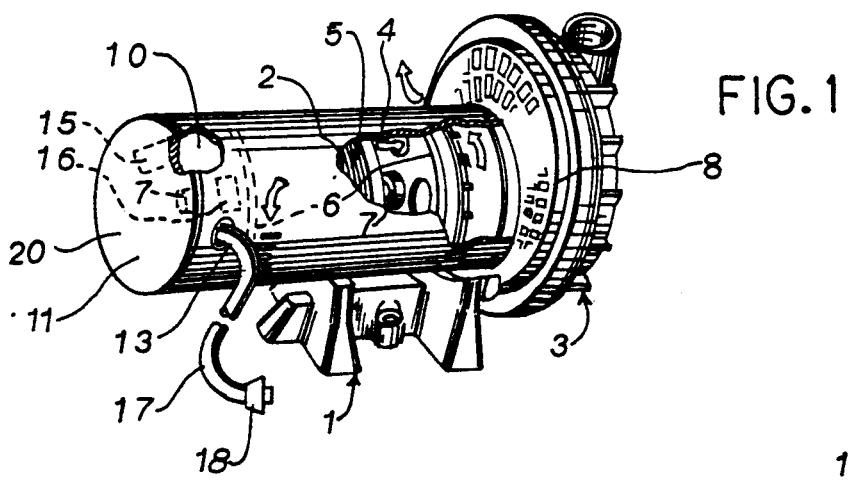
FIG. 1 is a pictorial view of a rotary motor pump unit incorporating an embodiment of the present invention.
Figure 2:
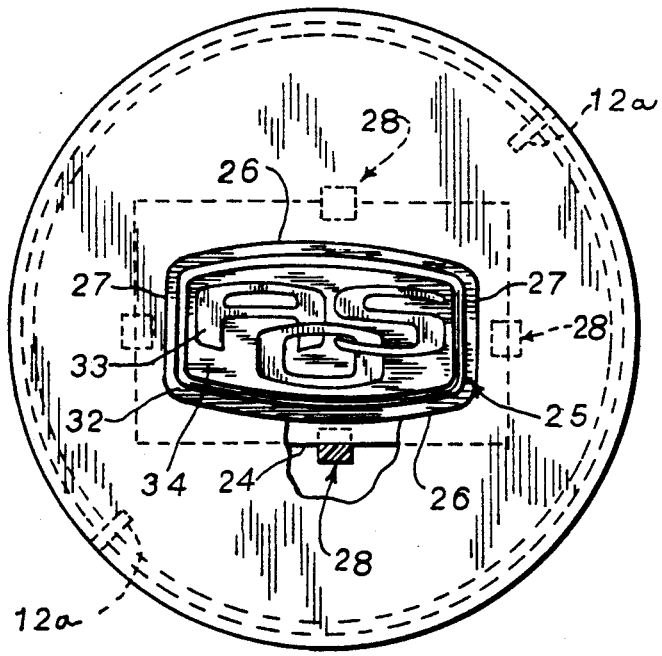
FIG. 2 is an enlarged end view of the motor pump unit FIG. 1.
Figure 3:
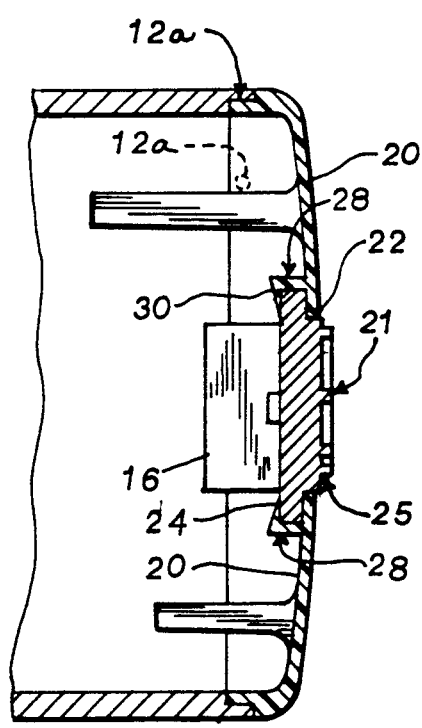
FIG. 3 is a vertical section taken generally on line 3—3 of FIG. 2.
Figure 4:
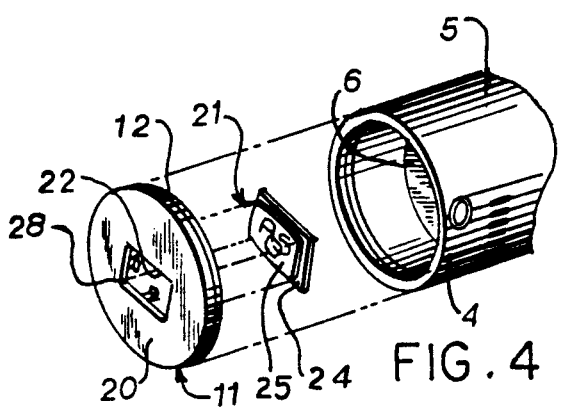
FIG. 4 is a pictorial exploded view of the structure shown in FIGS. 1-4.

Referring to the drawings and particularly to FIG. 1, a motor-pump unit 1 is illustrated including a motor 2 and a pump unit 3 secured to one end of the motor 2. The motor, in accordance with conventional construction and as more clearly shown in FIGS. 2 and 3, includes a cylindrical main frame 4. A stator unit 5 is affixed and secured within and to the frame. A pair of spaced end bearing frames or walls 6 are secured to the frame and rotatably support a rotor unit in alignment with the stator unit 5, with only rotor shaft 7 being shown. The one end of the main frame 4 is closed by the pump housing 8 and is located in spaced relation to the adjacent bearing walls 6 to define a fan and drip chamber 9. Thus, any water which leaks from the pump unit 3 into the motor frame is discharged through the drip chamber 9. This protects the motor, stator and rotor from the ill effects of water. The opposite end of the housing includes a power and control equipment chamber 10 within the extension of the frame 4 beyond the bearing end frame 6. The outer end of the frame is closed by an end cover unit 11. The end cover unit 11 is shown as a slightly dished member having a diameter essentially identical to that of the frame 4. The cover unit 11 includes an annular flange 12 set inward slightly to define an outer diameter complementing the interior diameter of the frame 4. The flange 12 projects into the frame 4 and is secured thereto in any suitable manner such as by suitable set screws 12a projecting through the frame 4 and threaded into appropriately threaded openings in the flange 12 to releasably secure the cover unit 11 to the main frame 4. The power and control equipment chamber 10 forms a smooth extension of the motor-pump unit with an esthetically pleasing appearance. Within the chamber, the incoming power cable 13 is connected to the motor windings, as at 14. A capacitor 15 is shown mounted within the unit and connected into the circuit with the motor windings. In addition, an electronic control module 16 is shown mounted within the chamber and in particular mounted as a part of the internal portion of the cap unit and interconnected into the circuit with the capacitor 15 to the motor winding to provide a particular control and operation of the motor. Generally, in motor-pump unit 1 for application to spas and the like, a remote control unit 17 is provided for actuating of the electronic control to start the motor-pump unit 1 and to further control the particular motor operation. For example and as illustrated, a pneumatic remote actuator 18 may be provided and interconnected to an opening in the cover to actuate a switch unit, not shown, connected into circuit with the electronic control module 16. In addition, other controls may be mounted within the compartment and connected in the motor control system within the compartment.

Thus, all power is supplied through the control chamber with the remote units providing for a pneumatic or other relatively totally safe control for use in a water bath, such as encountered in spas, whirlpools and the like. Generally, the motor structure as described is similar to that disclosed in the previously identified crossreferenced application. The present invention is particularly directed to the end cover unit 11, which is specially constructed to provide a limited access into the chamber or compartment.

Generally, the end cover unit 11 includes an end wall 20 integrally formed with the mounting flange. A removable door 21 is releasably secured within an opening 22 in the end wall 20. The electronic control module 16 is secured to the inner surface of the door 21, with heat sensitive elements 23 within module 16 abutting the inner surface of door 21, which is specially constructed to function a heat sink for rapid dissipation of the heat from sensitive elements 23. The outer surface of the door projects somewhat from the end wall 20 and is provided with a special finned structure which can be and is advantageously configured to define a decorative surface, and advantageously configured in accordance with a company's logo, name or the like. More particularly, the end wall 20 of the cover unit 11 is shown as a molded plastic member. The removable door 21 is formed of a suitable heat transfer metal, such as a cast aluminum, and includes an inner plate member 24 and an integral outer plate member 25 projecting through the opening 22. The outer configuration of the cast aluminum plate member 25 projecting from the base plate member 24 is shown conforming and complementing the shape of the opening 22. In the illustrated embodiment of the invention, the plate member 25 and opening 22 have complementing top and bottom curved walls or edges 26 with relatively straight side edges 27 smoothly merging into the curved edges 26 to provide a particularly pleasing appearance.

The door is releasably secured within the opening 22, with a releasable edge coupler 28 secured to the end wall 20 and releasably connected to the edge of plate member 24. In the illustrated embodiment of the invention, the coupler 28 includes a plurality of flexible hook arms 29 integrally molded or otherwise secured to the inner wall of the cover end wall 22 spaced slightly inwardly from the edge of the opening and projecting inwardly of the wall. Each flexible arm 29 includes a shank secured integrally molded with the base and projects outwardly into the integrally formed hook 30 spaced from the end wall 20. The door is formed with the plate member 24 larger than the opening 22 and with the outer edge spaced in accordance with the lateral spacing of the flexible arms 29 and fitted within the hooks 30. The arms 29 resiliently secure the plate member 24 abutting the interior of end wall 22 and the plate member 25 projecting through opening 22. The opposite sides of each hook are formed as inclined walls to establish cam edges. The door 21 can be aligned from the interior of the cover unit 11 with the plate 24 resting on the outer cam edges. Pushing inwardly deflects the arms 29 outwardly and allows the plate 24 to move into alignment with the space between the hooks 30 and end wall 20. The spacing of the hooks 30 from the inner surface of the cover wall 20 is in accordance with the thickness of the plate member 24 and thereby functions to firmly hold the door in abutting engagement with the cover and end wall 20 with the outer plate member 25 projecting outwardly through the opening 22.

The inner cam edges of the hooks 30 provide for convenient door removal. The door can be readily removed by pushing inwardly of the chamber, with the plate edges again acting on the inclined surfaces to deflect the flexible arms 29 outwardly to release the door from the cover wall 20. In the illustrated embodiment of the invention, the plate member 25 is formed with an outer margin 32 complementing the opening 22 to precisely locate the door and define a border around a logo. The margin and logo is formed by recesses 33 and raised edges 34 spaced within the border and from each other to define appropriate offsets to clearly set forth the logo or other decorative door relief. The offset relief 33 and 34 simultaneously provides a finned typed surface increasing the heat distributing area and thereby increasing the efficiency of the heat sinks.

Figure 5:
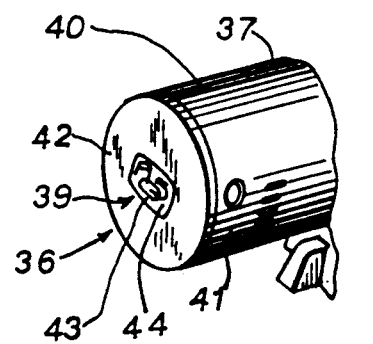
FIG. 5 is a fragmentary pictorial view of the control end motor illustrating an alternate embodiment of the invention.

FIG. 5 illustrates an alternate embodiment of the invention. Generally, the illustrated embodiment of FIG. 5 includes a self-contained motor 36 with an outer main frame 37 closed at one end by an end bearing frame, not shown. An end cup-shaped enclosure 39, such as a drawn metal cam member, has its open end telescoped into a recessed portion 40 of the main frame 37.

The enclosure 39 is secured to the main frame 37 in any suitable manner such as by releasable cap screws passing through openings in the outer edge portion of the enclosure and threaded into the corresponding threaded openings in the aligned main frame. The cup-shaped enclosure 39 extends axially outwardly from frame 37 and defines an essentially apparent extension of the motor frame. A plurality of power and control components 41 are mounted to and within the extended cover, generally in accordance with the teaching of the previously identified King application.

The outer axial end wall 42 of the enclosure 39 provided with an opening 43 for access to the control compartment defined by the enclosure, and particularly access to the components at the interconnecting thereof. A door unit 44 such as that previously formed and described in the first embodiment is releasably secured in the opening. An electronic module 45 or other suitable control component is mounted directly to the inner door surface for access in the same manner as in the multiple compartmented motor of the first embodiment.

The present invention provides a relatively simple but particularly practical and commercially produced apparatus for cost effective and efficient servicing of motor and like integrated controls.

Various modes of carrying out the invention are contemplated as being within the scope of the following claims particularly pointing out and distinctly claiming the subject matter which is regarded as the invention.

I claim:

1. A dynamoelectric machine having a main cylindrical frame supporting a stator unit and a rotor unit within said stator unit, comprising an integrated power and control compartment secured to one end of said motor frame and forming an extension of said cylindrical motor frame, a plurality of power and control components mounted within said compartment and interconnected to each other and to the motor windings, said compartment defining a substantially sealed enclosure for protecting of the electrical connections and components therein from the surrounding environment, an opening within one wall of said compartment, a door unit releasably secured within said opening and effectively sealing said opening, at least one of said power and control components mounted to the interior surface of, said door unit and providing direct access to said component on said door unit upon removal of said door unit.

2. An electric motor having a cylindrical main frame and a stator unit having a round core fixed to the inner interior wall of said main frame and end bearing walls secured to said main frame and closing a first end of said main frame, a cup-shaped cover secured to said first end of said main frame and projecting axially outwardly therefrom to form a sealed power and control compartment, said end cover having an outer cylindrical wall and an axial end wall and having a central opening within said end wall and in substantial spaced relation to said outer cylindrical wall, said opening permitting access to said compartment, a door releasably mounted within said opening in sealing engagement with the cover wall, said door formed of a metal providing for rapid transfer of heat and having an inner planar wall, an electronic control module having a planar heat dissipating wall, means securing said module with said heat dissipating wall in firm abutting engagement with said inner planar wall of said door and establishing a high heat transfer interface from said module to said door, said electronic control module including heat sensitive solid state elements in heat interchange engagement with said heat dissipating planar planar wall whereby said door functions as an effective heat distributing member and provides for ready access to said electronic module for monitoring and servicing of said electronic module.

3. The dynamoelectric machine of claim 1, wherein said door unit is formed of a metal member having a high heat transfer rate, said metal member having a smooth inner planar surface, said control component on said door unit including an electronic module having a planar heat exchange surface, and means securing said module with said heat exchange surfaces in close abutting engagement and establishing a high heat transfer interface between said module and said door unit.

4. The machine of claim 3, wherein said door unit includes an integral outer projecting member including a plurality of non-uniformly distributed recesses and projecting walls and thereby defining an increased heat exchange surface with the surrounding environment.

5. A dynamoelectric machine having a main tubular cylindrical frame with a stator unit secured to the interface of the frame and a rotor unit rotatably mounted within said stator unit, with a power and control compartment having an outer cylindrical wall secured as an extension of said frame and including an outer end closure wall substantially sealing the control compartment, the improvement in the control compartment comprising an opening within said end closure wall, a door unit releasably secured within said opening and closing said opening and having an inner wall, power and control components mounted within said compartment, and an electronic unit having heat sensitive elements with an exposed surface, means mounting said electronic unit with said exposed surface abutting the inner wall of said door unit and establishing transfer of heat from the heat sensitive elements to the door unit for dissipation therethrough, said door unit providing for direct access to said control components within said compartment wall and to said electronic control unit by removal of said door unit for monitoring and servicing of said components and said electronic unit.

6. The machine of claim 5, wherein said door inner wall has an inner planar surface aligned with the planar surfaces of said heat sensitive elements.

7. The dynamoelectric machine of claim 5, wherein said door includes an inner heat exchange plate and an integral meal plate projecting outwardly through said opening from said heat exchange plate, said integral metal plate including a plurality of recesses projecting inwardly from the outermost surface in a preselected pattern and defining an enlarged heat exchange surface with the surrounding environment.

8. The dynamoelectric machine of claim 7, wherein said integral metal member of said door includes an outer edge complementing and abutting the edge of said opening, and projecting outwardly from said opening, a decorative recess located in inwardly spaced relation to said outer edge and defining a border essentially corresponding to the configuration of said opening.

9. The dynamoelectric machine of claim 7, wherein said walls of said control compartment are integrally molded of plastic.

10. The dynamoelectric machine of claim 5, including a releasable deflectable spring member interconnected to said enclosure wall adjacent said opening and including gripping end portions, said door unit including an inner heat transfer plate abutting the inner surface of said wall, said plate having an outer edge portion aligned with said fingers and operable to deflect said fingers outwardly to establish a firm clamping interengagement between said fingers and said plate and thereby releasably mounting said plate within said enclosure wall.

11. An electric motor having a cylindrical main frame and a stator unit having a round core fixed to the inner interior wall of said main frame, end bearing walls secured within said main frame and having at least a bearing end wall secured in spaced relation to the first end of said main frame and defining a power and control equipment compartment between said first end of said main frame and said end bearing wall, an end cap secured to said first end of said main frame and sealing said end of said frame, said end cap having an opening within said end cap and said opening permitting access to said compartment, a door releasably mounted, within said opening in sealing engagement with the end cap, said door being formed of a metal providing for rapid transfer of heat and having an inner planar wall, an electronic control module having a planar wall, means securing said planar wall of said module into firm abutting engagement with said inner planar wall of said door and establishing a high heat transfer interface from said module to said door, said electronic module including heat sensitive solid state elements in heat interchange engagement with said planar wall of said module whereby said door provides access to said compartment and functions as an effective heat distributing member under normal operations and provides for ready access to said electronic module for monitoring and servicing of said electronic module.

12. The motor of claim 11, wherein said end cap includes a substantially flat outer wall, said door includes an integral metal member projecting outwardly through said opening, said integral metal member including a plurality of recesses projecting inwardly from the outermost surface in a preselected pattern and defining an enlarged heat exchange surface with the surrounding environment.

13. The motor of claim 12, wherein said integral metal member of said door includes an outer edge complementing and abutting the edge of said opening and projecting outwardly from said opening.

14. The motor of claim 13, including a recess located in inwardly spaced relation to said outer edge and defining a border essentially corresponding to the configuration of said opening.

15. The motor of claim 13, wherein said door includes an inner plate integral with said integral metal member, and inner coupling members secured to said cap and releasably engaging the inner plate to releasably lock the door within said opening.

16. The motor of claim 15, wherein said coupling members are deflectable spring members interconnected to said end cap and including outer gripping end portions, said inner plate including a peripheral wall located in engagement with said spring members, said peripheral wall having an outer edge portion aligned with said fingers and operable to deflect said fingers outwardly to cause a firm clamping interengagement between said fingers and said plate.

17. The motor of claim 2, wherein said cover is a molded plastic member, said door includes an inner plate secured to said cover wall and an integral outer plate projecting outwardly of said opening, said outer plate having a plurality of spaced recesses defining a large heat dissipating surface.

18. The motor of claim 17, wherein said door is a cast aluminum member.

* * * * *

UNITED STATES PATENT AND TRADEMARK OFFICE
CERTIFICATE OF CORRECTION

PATENT NO. : 5,004,942

DATED : April 2, 1991

INVENTOR(S) : JAMES L. KING

It is certified that error appears in the above-identified patent and that said Letters Patent is hereby corrected as shown below:

Claim 1, column 6, line 38, after "of" delete ","; Claim 2, column 6, line 64, after "dissipating" delete "planar planar"; Claim 3, column 7, line 1, delete "THe" and substitute therefor -- The --; Claim 7, column 7, line 42, delete "meal" and substitute therefor -- metal --; Claim 10, Claim 11, column 8, line 14, after "mounted" delete ",".

Signed and Sealed this

Twenty-second Day of September, 1992

*Attest:*

DOUGLAS B. COMER

*Attesting Officer*     *Acting Commissioner of Patents and Trademarks*